(12) United States Patent
Oh et al.

(10) Patent No.: US 8,708,028 B2
(45) Date of Patent: Apr. 29, 2014

(54) WINDOW BLIND ASSEMBLY FOR VEHICLE

(75) Inventors: Won Suk Oh, Seoul (KR); Ki Kyung Bae, Anseong-si (KR); Ki Hong Kim, Anseong-si (KR); Jeong Soon Park, Ansan-si (KR); Bong Jung Kim, Anseong-si (KR); Kyoo Kang Shim, Pyeongtaek-si (KR)

(73) Assignee: Korea Fuel-Tech Corporation, Gyeonggi-Do (KR)

( * ) Notice: Subject to any disclaimer, the term of this patent is extended or adjusted under 35 U.S.C. 154(b) by 247 days.

(21) Appl. No.: 13/215,790

(22) Filed: Aug. 23, 2011

(65) Prior Publication Data

US 2012/0048489 A1 Mar. 1, 2012

(30) Foreign Application Priority Data

Aug. 26, 2010 (KR) .......................... 10-2010-0082972
Oct. 22, 2010 (KR) .......................... 10-2010-0103446

(51) Int. Cl.
*B60J 1/20* (2006.01)
*B60J 3/00* (2006.01)
*B60J 11/00* (2006.01)
*A47H 3/00* (2006.01)
*E06B 9/17* (2006.01)

(52) U.S. Cl.
USPC ...................... 160/370.22; 160/274; 296/97.8

(58) Field of Classification Search
USPC ............. 160/238, 66, 265, 266, 267.1, 268.1, 160/272, 274, 277, 370.21–370.23, 39, 70, 160/79; 296/97.8
See application file for complete search history.

(56) References Cited

U.S. PATENT DOCUMENTS

| 6,983,786 B2 * | 1/2006 | Chen ........................ 160/370.22 |
| 7,455,345 B1 * | 11/2008 | Kim ............................ 296/97.4 |
| 2003/0066615 A1 * | 4/2003 | Bong ........................ 160/370.22 |
| 2007/0144690 A1 * | 6/2007 | Heinrich et al. .......... 160/370.22 |
| 2012/0048483 A1 * | 3/2012 | Ojima et al. ............... 160/267.1 |

* cited by examiner

*Primary Examiner* — Katherine Mitchell
*Assistant Examiner* — Jeremy Ramsey
(74) *Attorney, Agent, or Firm* — McCarter & English, LLP; David R. Burns

(57) ABSTRACT

There is a need for a window blind assembly for a vehicle, in which vibration and noise are reduced when a shade curtain moves and which is convenient to be transported. The window blind assembly for a vehicle includes: a main frame; a pair of connection units arranged in the main frame; a rotary shaft rotationally arranged in the connection units; a pair of guide rails rotationally arranged in the connection units and formed with guide grooves; a shade curtain supporter movably coupled to the guide grooves of the pair of guide rails; a shade curtain including one side end portion connected to the rotary shaft and rolled into the rotary shaft, and the other side end portion connected to the shade curtain supporter and unrolled as the shade curtain supporter becomes apart from the rotary shaft; and a driving unit providing driving force to move the shade curtain supporter along the guide rail.

17 Claims, 19 Drawing Sheets

(a)

(b)

(a)

(b)

(a)

A - A (b)

B - B

WINDOW BLIND ASSEMBLY FOR VEHICLE

CROSS-REFERENCE TO RELATED APPLICATIONS

This application claims the benefit of priorities of Korean Patent Application No. 10-2010-0082972 filed on Aug. 26, 2010 and Korean Patent Application No. 10-2010-0103446 filed on Oct. 22, 2010, all of which are incorporated by reference in their entirety herein.

BACKGROUND OF THE INVENTION

1. Field of the invention

The present invention relates to a window blind assembly for a vehicle, and more particularly to a window blind assembly for a vehicle, which is arranged on a window of a car and blocks light from coming through the window.

2. Related Art

In a car, the recent trend is to provide a relatively large-sized window taking design or the like into account. The car having such a large-sized window has merits in satisfying a car buyer with beauty.

However, strong sunlight may penetrate the large-sized window provided for emphasizing the beautiful design of the car, and heat due to the penetrated strong sunlight may be accumulated inside the car and offend a passenger in the car.

To prevent the heat from being accumulated inside the car due to sunlight transmitted through the large-sized window, too much load is applied to an air conditioner, thereby causing energy loss to increase. Also, the large-sized window laying emphasis on the beautiful design is disadvantageously vulnerable to protect privacy of a passenger in the car. Thus, a window blind has been developed for covering the window of the car so as to block the light penetrated into the car through the window and protect the passenger's privacy. However, a conventional window blind for a car has a problem of causing vibration and noise when a shade curtain reciprocates. Also, a conventional window blind for a car is so bulky that it is inconvenient to be transported, thereby increasing cost of transport.

SUMMARY OF THE INVENTION

Accordingly, the present invention is conceived to solve the forgoing problems, and an aspect of the present invention is to provide a window blind assembly for a vehicle, in which vibration and noise are reduced when a shade curtain moves and which is convenient to be transported.

Technical aspects of the present invention are not limited to the foregoing technical aspect, and other technical aspects not mentioned above will be clearly understood by those skilled in the art from the following descriptions.

The foregoing aspects may be achieved by providing a window blind assembly for a vehicle, including: a main frame; a pair of connection units arranged in the main frame; a rotary shaft rotationally arranged in the connection units; a pair of guide rails rotationally arranged in the connection units and firmed with guide grooves; a shade curtain supporter movably coupled to the guide grooves of the pair of guide rails; a shade curtain including one side end portion connected to the rotary shaft and rolled into the rotary shaft, and the other side end portion connected to the shade curtain supporter and unrolled as the shade curtain supporter becomes apart from the rotary shaft; and a driving unit providing driving force to move the shade curtain supporter along the guide rail.

The connection unit may include a guide rail connecting part integrally thrilled protruding from one side of the connection unit, the guide rail connecting part may include a connection unit hinge at an end portion thereof, and the guide rail may include a guide rail hinge formed at an end portion thereof and hingedly coupled to the connection unit hinge.

The guide rail connecting part may include a connection unit guide groove so that opposite end portions of the shade curtain supporter are retractable as being at least partially accommodated in the connection unit guide grooves.

The guide groove and the connection unit guide groove may have the same cross-section shape as each other so that the opposite end portions of the shade curtain supporter can move softly between the guide groove and the connection unit guide groove.

The connection unit hinge and the guide rail hinge may be positioned out of a moving path of the shade curtain supporter when the opposite end portions of the shade curtain supporter move between the guide groove and the connection unit guide groove as being at least partially accommodated in the guide grooves.

The connection unit hinge may include a first connection unit hinge and a second connection unit hinge spaced apart from each other to form a hinge guide slit therebetween, and the opposite end portions of the shade curtain supporter may pass through the hinge guide slit when moving between the guide groove and the connection unit guide groove.

The guide rail hinge may include a first guide rail hinge and a second guide rail hinge spaced apart from each other to form a guide slit therebetween, and the opposite end portions of the shade curtain supporter may pass through the guide slit when moving between the guide groove and the connection unit guide groove.

The guide rail hinge may include a first guide rail hinge and a second guide rail hinge spaced apart from each other, the first connection unit hinge and the first guide rail hinge may be rotationally coupled with respect to a first hinge shaft, and the second connection unit hinge and the second guide rail hinge may be rotationally coupled with respect to a second hinge shaft.

The connection unit may include a rotary shaft connecting part which protrudes from one side of the connection unit and in which the rotary shaft is rotationally arranged.

One side of the rotary shaft may rotationally couple with the rotary shaft connecting part of one of the pair of connection units, the other side of the rotary shaft may rotationally couple with a rotary shaft coupler, and the rotary shaft coupler may irrotationally couple with the rotary shaft connecting part of the other one of the pair of connection units.

The rotary shaft may be internally provided with a spring, and the spring may include one side coupled to the rotary shaft and the other side coupled to the connection unit.

The rotary shaft may include one side to which a first rotary shaft coupler is coupled and the other side to which a second rotary shaft coupler is rotatably coupled, the first rotary shaft coupler may be rotationally coupled to the rotary shaft connecting part of one of the pair of connection units, and the second rotary shaft coupler may be irrotatably coupled to the rotary shaft connecting part of the other one of the pair of connection units.

The driving unit may include: a motor; a gear assembly connected to the motor; and a first wire having a closed-loop shape and connected to the gear assembly so that driving force of the motor can be transferred to the shade curtain supporter.

The first wire may form a pair to respectively transfer driving force to opposite end portions of the shade curtain supporter.

The gear assembly may include a wire driving wheel to transfer rotary force from the motor to the pair of first wires, and the pair of first wires may be connected to the wire driving wheel so that the pair of first wires can rotate in opposite directions to each other.

The driving unit may further include a support wheel unit, and the first wire may include one side end portion connected to the gear assembly, and the other side end portion rotationally supported by the support wheel unit.

The shade curtain supporter may include a support body connected to the one side end portion of the shade curtain, and a connecting part formed at opposite end portions of the support body, and the connecting part may be fastened to the first wire so that the support body can move as the first wire rotates.

The support wheel unit may be arranged in the guide rail so as to rotationally support one side end portion of the first wire.

The driving unit may further include a guide wheel unit positioned between the gear assembly and the support wheel unit so as to guide the first wire.

The support wheel unit may be arranged in the main frame, and the driving unit may include a second wire which has one side connected to the support wheel unit so as to transform rotary motion of the support wheel unit into rectilinear motion, and the other side connected to the shade curtain supporter so as to move the shade curtain supporter.

DESCRIPTION OF EXEMPLARY EMBODIMENTS

Hereinafter, exemplary embodiments of the present invention will be described in detail with reference to accompanying drawings. However, the present exemplary embodiments are not limited to the exemplary embodiments disclosed below but may be achieved in various forms. The present exemplary embodiments are provided only for completing the disclosure of the present invention, and let a person having an ordinary skill in the art completely understand the scope of the present invention. Throughout the drawings, shapes or the like of elements may be exaggerated for clearer explanation, and like numerals refer to like elements.

Figure 1:
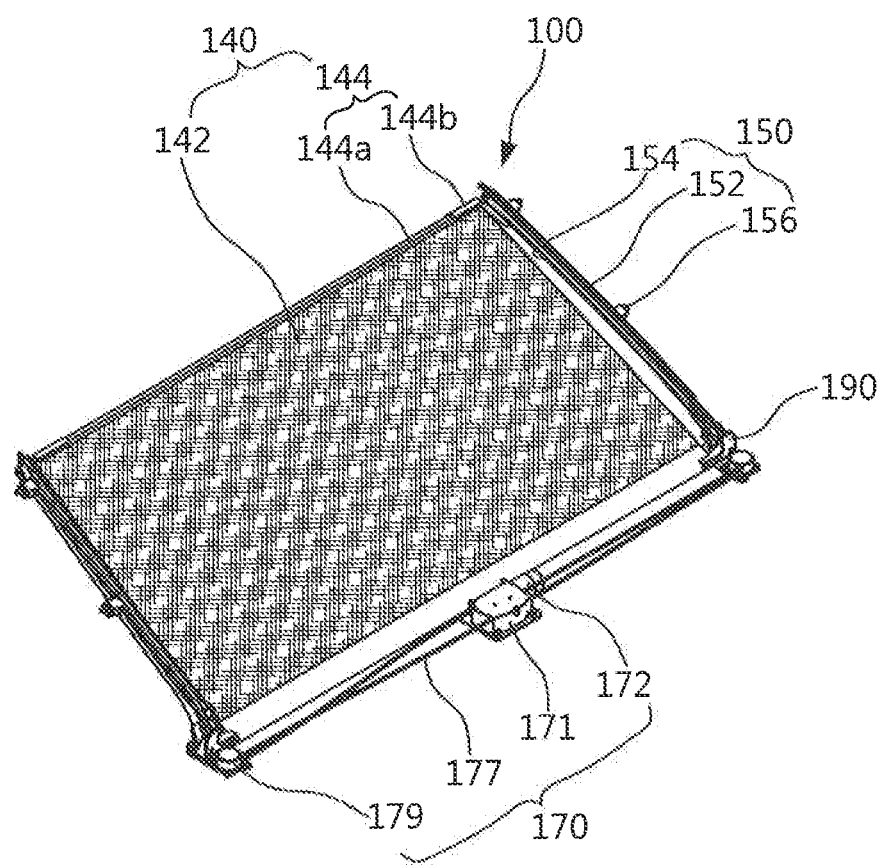
FIG. 1 is a perspective view showing an unrolled state of a shade curtain, in association with a window blind assembly for a vehicle according to a first exemplary embodiment of the present invention.
Figure 2:
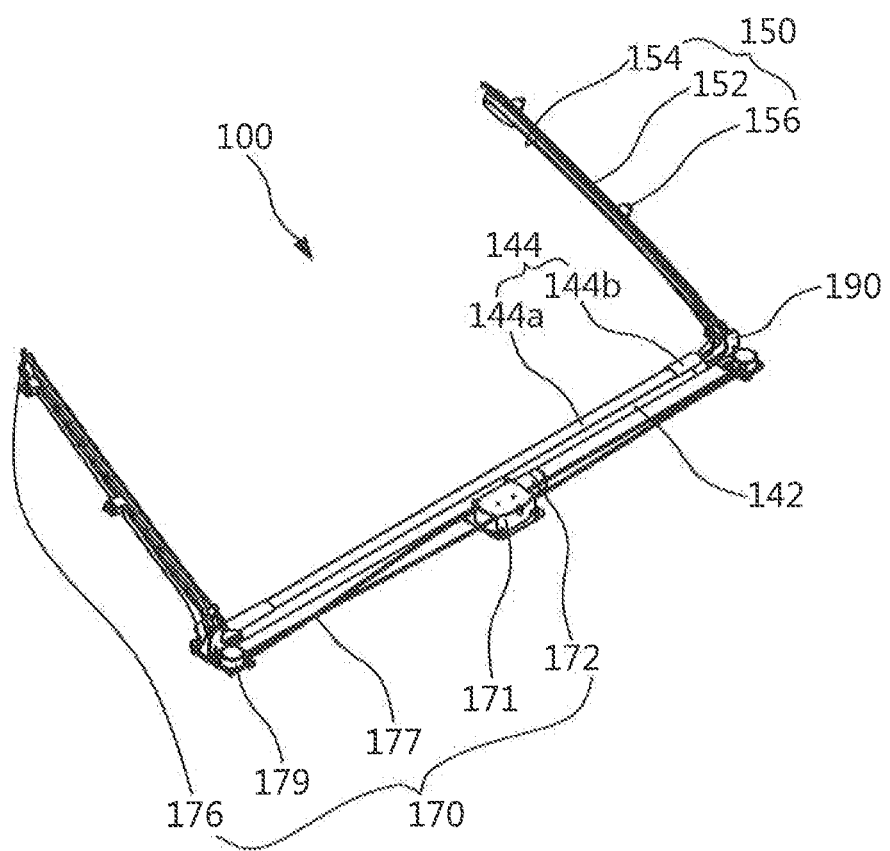
FIG. 2 is a perspective view showing a state that the shade curtain is rolled into a rotary shaft, in association with the window blind assembly for a vehicle according to the first exemplary embodiment of the present invention.
Figure 3:
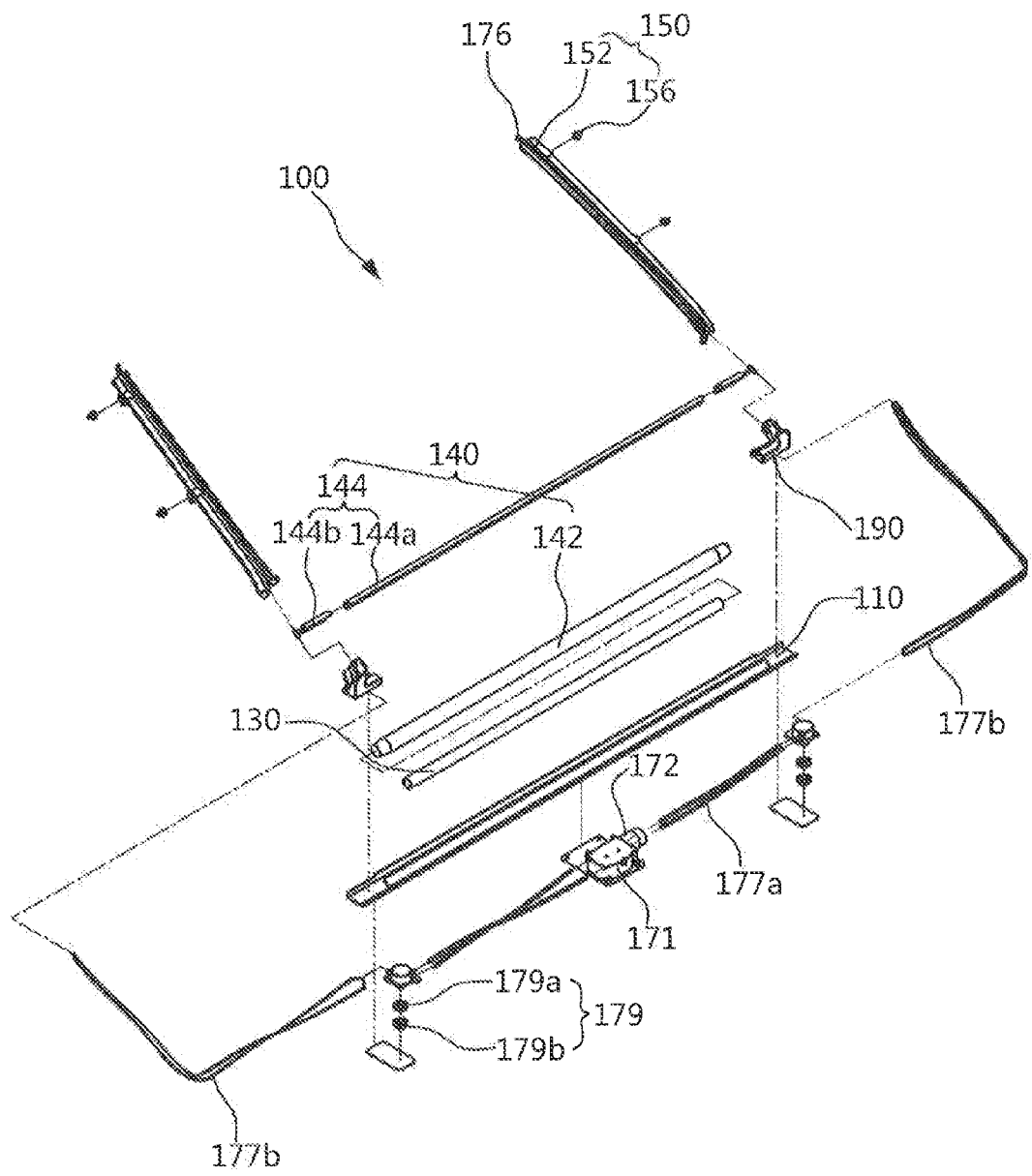
FIG. 3 is an exploded perspective view of the window blind assembly for a vehicle according to the first exemplary embodiment of the present invention.
Figure 4:
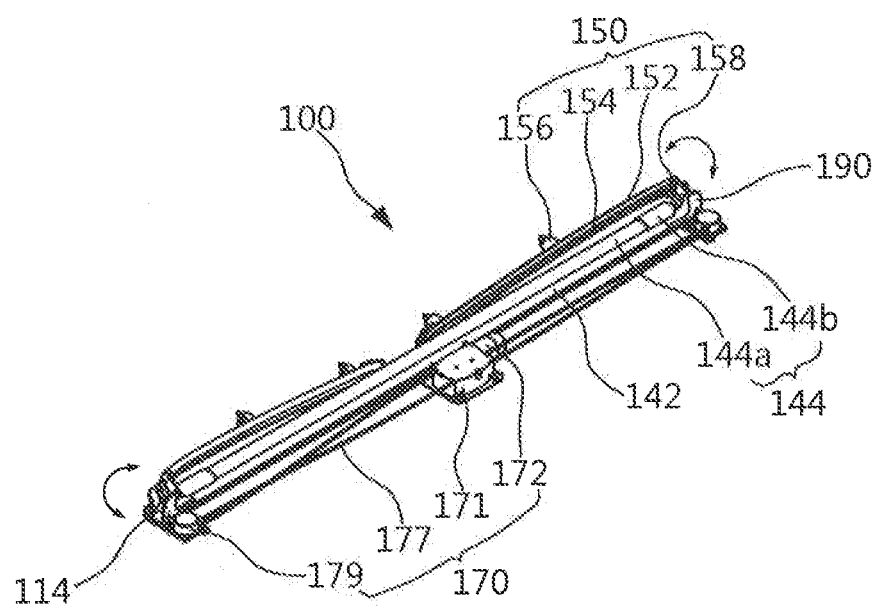
FIG. 4 is a perspective view showing a state that a guide rail is folded, in association with the window blind assembly for a vehicle according to the first exemplary embodiment of the present invention.
Figure 5:
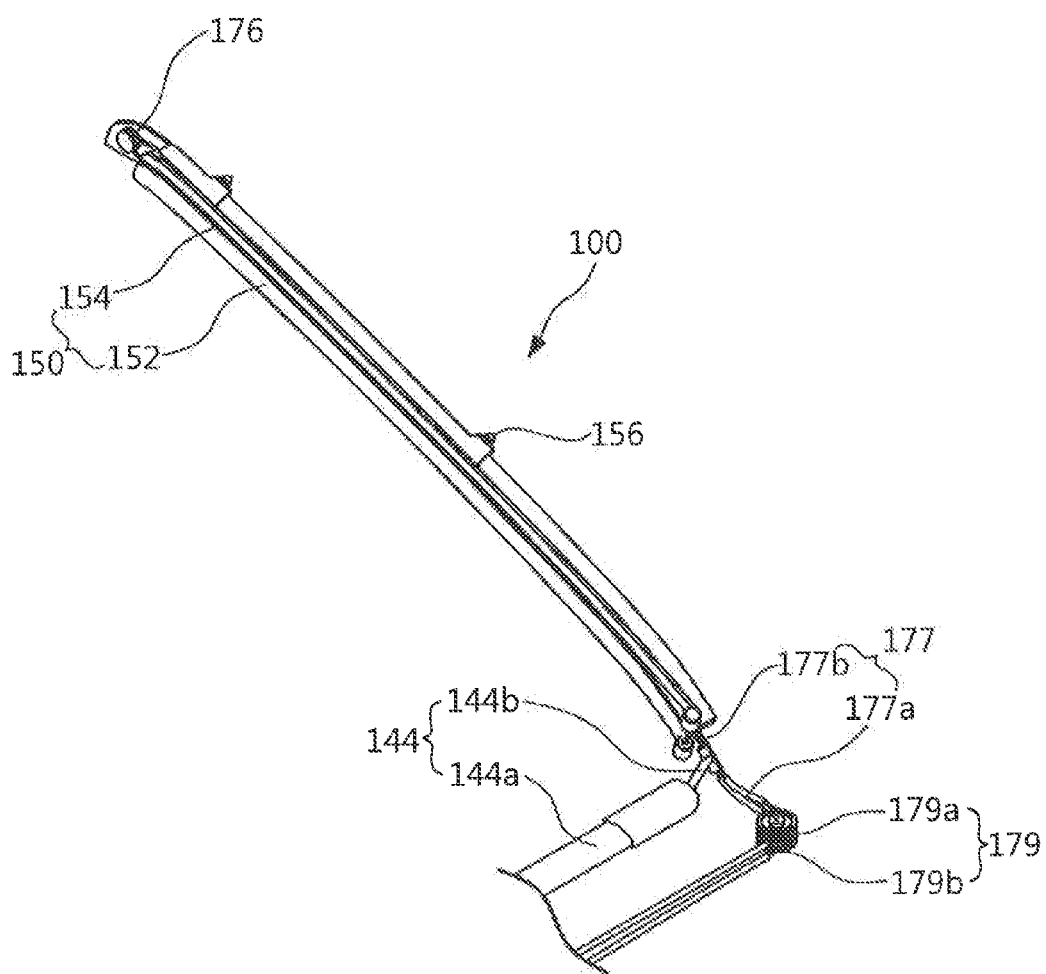
FIG. 5 is a partial perspective view for explaining connection relationship among a connecting part, a wire, the guide rail and a guide wheel unit, in association with the window blind assembly for a vehicle according to the first exemplary embodiments of the present invention.
Figure 6:
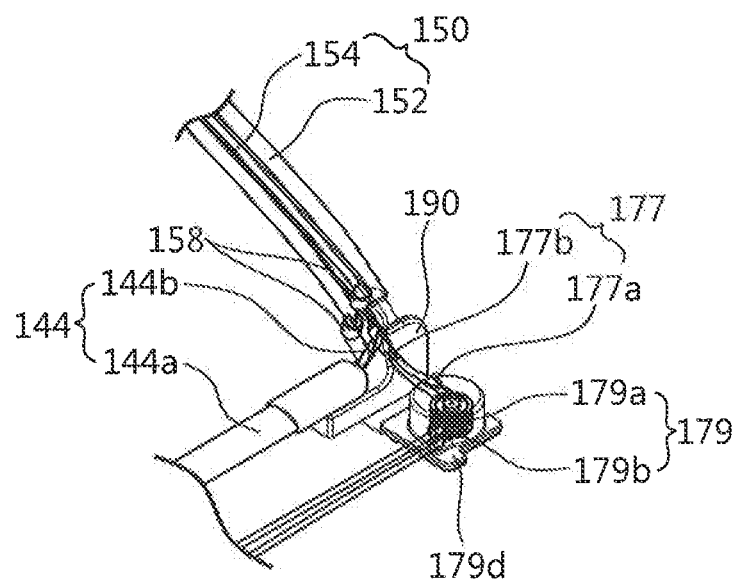
FIGS. 6 and 7 are enlarged perspective views for explaining the connection relationship among the connecting part, the wire, the guide rail and the guide wheel unit, in association with the window blind assembly for a vehicle according to the first exemplary embodiments of the present invention.
Figure 7:
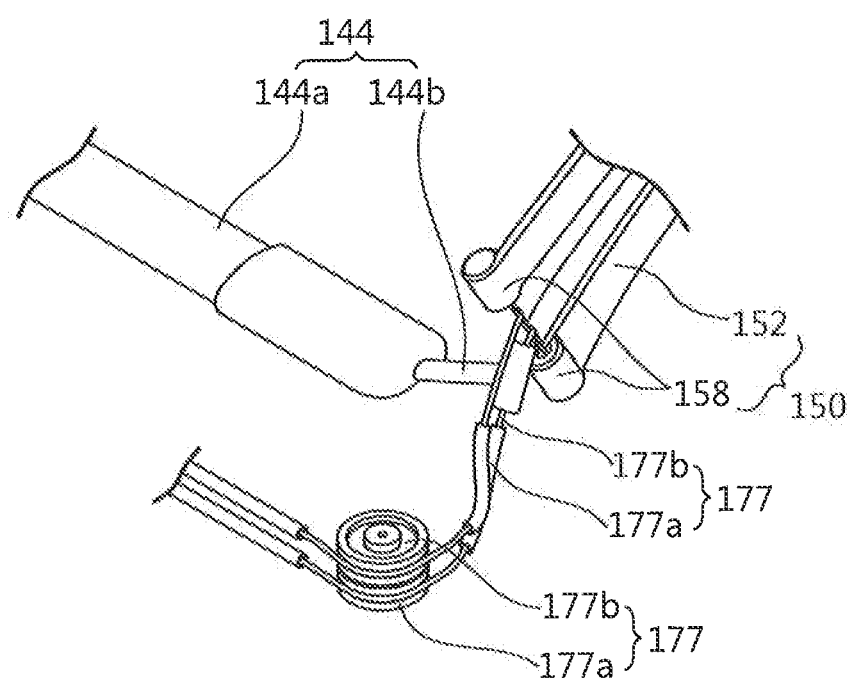
Figure 8:
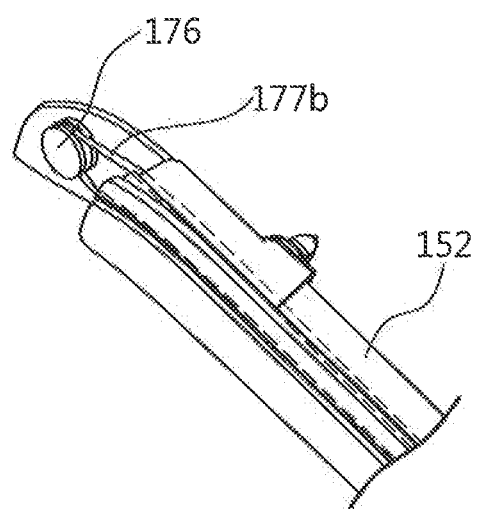
FIG. 8 is an enlarged perspective view of a support wheel unit in association with the window blind assembly for a vehicle according to the first exemplary embodiments of the present invention.
Figure 9:
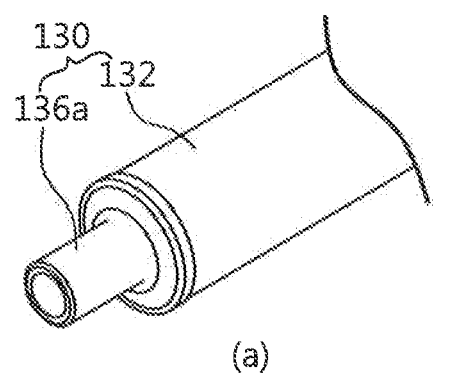
FIG. 9 is an enlarged perspective view of a shaft unit in association with the window blind assembly for a vehicle according to the first exemplary embodiments of the present invention.
Figure 9:
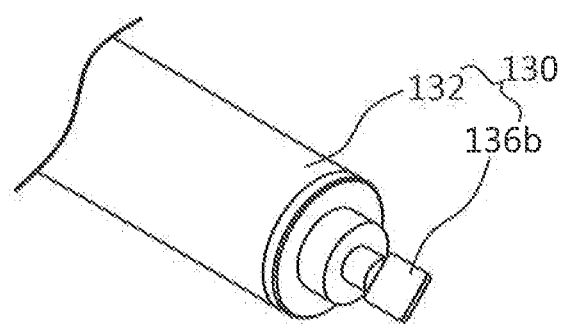
Figure 10:
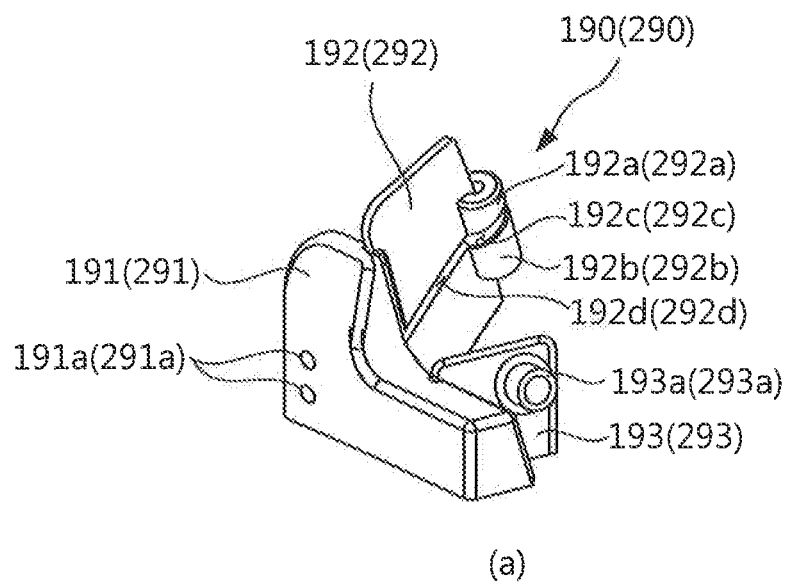
FIG. 10 is an enlarged perspective view of a rotary shaft supporter in association with the window blind assembly for a vehicle according to the first exemplary embodiments of the present invention.
Figure 10:
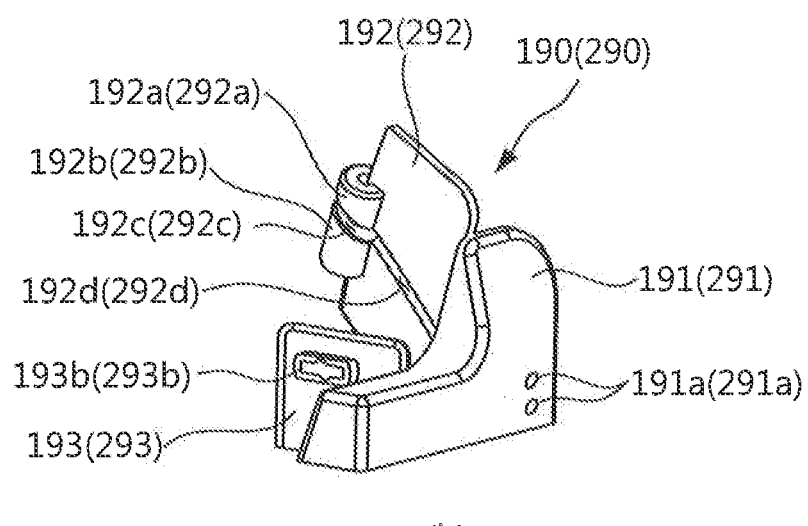
Figure 11:
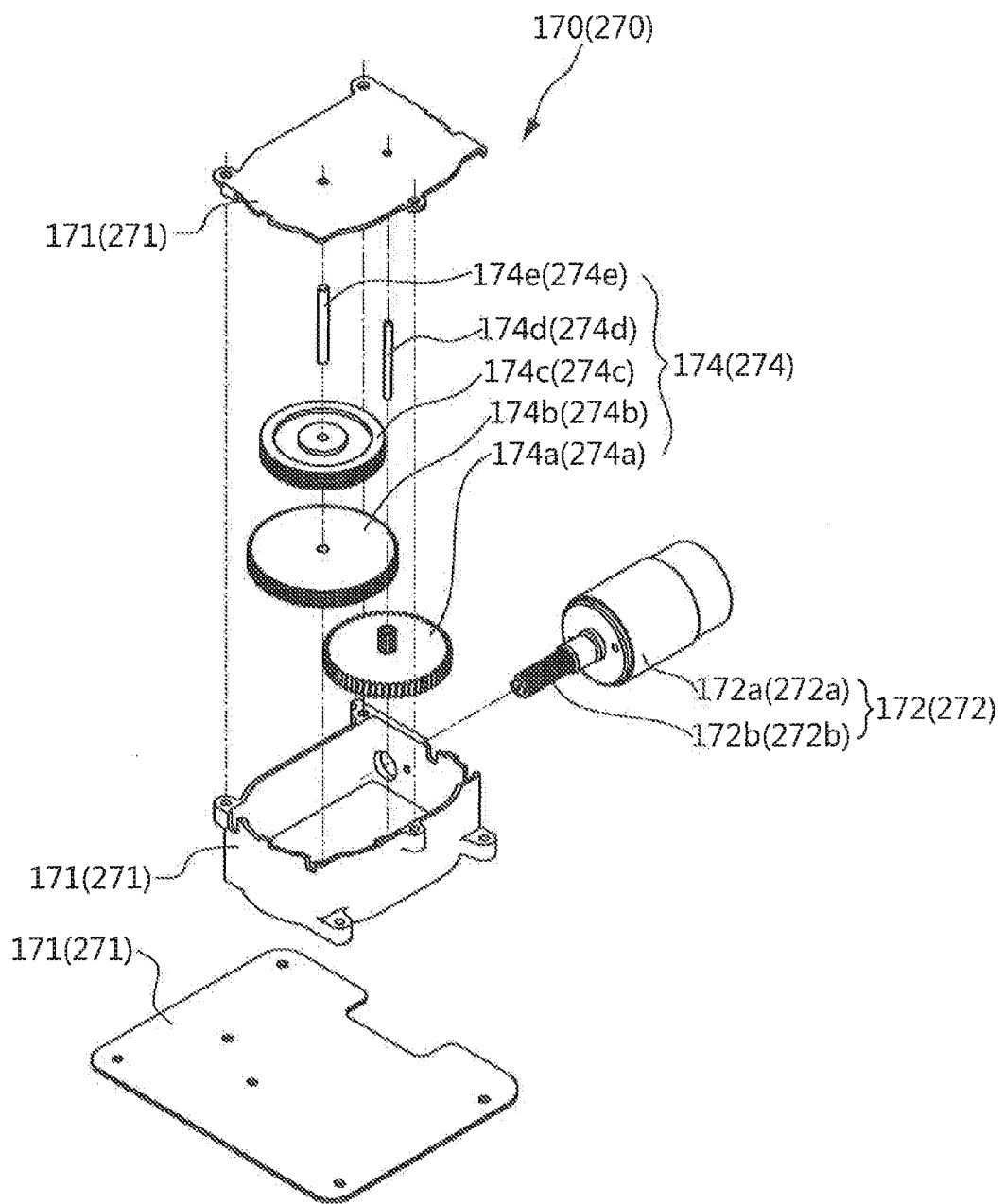
FIGS. 11 and 12 are exploded perspective views of a gear assembly in association with the window blind assembly for a vehicle according to the first and second exemplary embodiments of the present invention.
Figure 12:
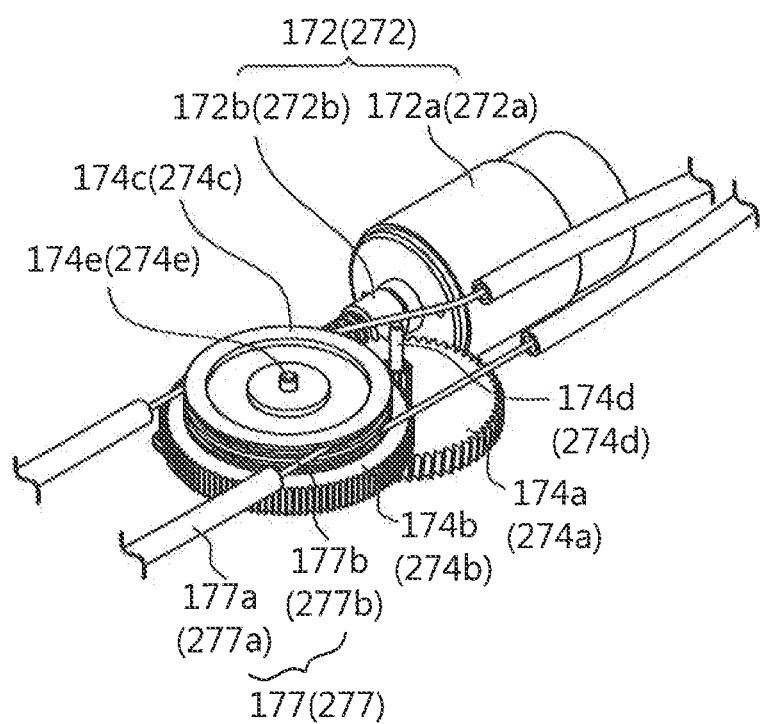

FIG. 1 is a perspective view showing an unrolled state of a shade curtain, in association with a window blind assembly for a vehicle according to a first exemplary embodiment of the present invention. FIG. 2 is a perspective view showing a state that the shade curtain is rolled into a rotary shaft, in association with the window blind assembly for a vehicle according to the first exemplary embodiment of the present invention. FIG. 3 is an exploded perspective view of the window blind assembly for a vehicle according to the first exemplary embodiment of the present invention. FIG. 4 is a perspective view showing a state that a guide rail is folded, in association with the window blind assembly for a vehicle according to the first exemplary embodiment of the present invention. FIG. 5 is a partial perspective view for explaining connection relationship among a connecting part, a wire, the guide rail and a guide wheel unit, in association with the window blind assembly for a vehicle according to the first exemplary embodiments of the present invention. FIGS. 6 and 7 are enlarged perspective views for explaining the connection relationship among the connecting part, the wire, the guide rail and the guide wheel unit, in association with the window blind assembly for a vehicle according to the first exemplary embodiments of the present invention. FIG. 8 is an enlarged perspective view of a support wheel unit in association with the window blind assembly for a vehicle according to the first exemplary embodiments of the present invention. FIG. 9 is an enlarged perspective view of a shaft unit in association with the window blind assembly for a vehicle according to the first exemplary embodiments of the present invention. FIG. 10 is an enlarged perspective view of a rotary shaft supporter in association with the window blind assembly for a vehicle according to the first exemplary embodiments of the present invention. FIGS. 11 and 12 are exploded perspective views of a gear assembly in association with the window blind assembly for a vehicle according to the first and second exemplary embodiments of the present invention. The window blind assembly may be arranged on lateral windows as well as a back window inside the vehicle.

As shown in FIGS. 1 to 3, a window blind assembly 100 for a vehicle according the first exemplary embodiment includes a main frame 110, a shaft unit 130, a blind unit 140, a guide rail 150, a driving unit 170, and a connection unit 190.

As shown in FIG. 3, the main frame 110 may be arranged in a boundary region between a back window and a trunk of a vehicle. Also, the main frame 110 may be arranged in parallel with the shaft unit 130 inside the vehicle.

Referring to FIGS. 3 and 9, the shaft unit 130 includes a rotary shaft 132, a first rotary shaft coupler 136a, and a second rotary shaft coupler 136b.

Around the rotary shaft 132 the shade curtain 142 may be wound. The first rotary shaft coupler 136a may be rotationally or irrotationally coupled to one end portion of the rotary shaft 132. The second rotary shaft coupler 136b may be rotationally coupled to the other end portion of the rotary shaft 132. The first rotary shaft coupler 136a may have a circular cross-section so as to be rotationally coupled to a first rotary shaft supporter 193a (refer to FIG. 9). The second rotary shaft coupler 136b may have a rectangular cross-section so as to be irrotationally coupled to a second rotary shaft supporter 193b (refer to FIG. 9). The rotary shaft 132 may be internally provided with a spring (not shown) so that the rotary shaft 132 can be pre-stressed in the wind-up direction of winding the shade curtain 142 around the rotary shaft 132 (or in the reverse direction). The spring may have one side fastened to the inside of the rotary shaft 132 and the other side fastened to the rotary shaft supporter 134.

As shown in FIGS. 1 to 3, the blind unit 140 includes the shade curtain 142 and a shade curtain supporter 144.

The shade curtain 142 may be a flexible fabric. Alternatively, the shade curtain 142 may be made of various materials which can fully or partially (i.e., semi-transparently) block light or heat. The shade curtain 142 may have one side end portion connected to the shade curtain supporter 144, and the other side end portion connected to the rotary shaft 132 so that the shade curtain 142 can be unrolled as the shade curtain supporter 144 moves up (i.e., as the shade curtain supporter becomes apart from the rotary shaft).

As shown in FIG. 5, the shade curtain supporter 144 includes a support body 144a and a connecting part 144b. The support body 144a is connected to one side end portion of the shade curtain 142. Thus, when the support body 144a moves up along the guide rail 150, the shade curtain 142 wound around the rotary shaft 132 can be unrolled.

The connecting parts 144b may be formed at opposite end portions of the support body 144a. The connecting part 144b may be at least partially accommodated in a guide groove 154 of the guide rail 150. The connecting part 144b is firmly fastened to a wire 177b so that the support body 144a can move up or down along the guide rail 150.

As shown in FIGS. 1 to 5, the guide rail 150 includes a guide rail body 152, the guide groove 154, a guide rail supporter 156, and a guide rail hinge 158.

The guide rail body 152 may be formed with the guide groove 154 so that the connecting part 144b of the shade curtain supporter 144 can be at least partially accommodated in the guide rail body 152. To fasten the guide rail body 152 to a car chassis, the guide rail body 152 may be formed with a plurality of guide rail supporters 156.

The guide rail body 152 is formed with the guide rail hinge 158 at an end portion thereof so that the guide rail 150 can be rotationally coupled to the connection unit 190. The guide rail hinge 158 is hingedly-coupled to a connection hinge 192 of the connection unit 190. FIG. 4 shows that the guide rail 150 is folded. If the window blind assembly for a vehicle is transported while the guide rail is folded, the volume of the assembly is decreased to thereby have an effect on convenience of transport and reduced cost of transport.

As shown in FIGS. 1, 2, 11 and 12, the driving unit 170 includes a casing 171, a motor 172, a gear assembly 174, a support wheel unit 176, a power transmission member 177, and a guide wheel unit 179.

The driving unit 170 provide driving force to the blind unit 140 so that the shade curtain supporter 144 can move up or down along the guide rail 150.

The casing 171 accommodates the gear assembly 174 therein. The motor 172 includes a motor body 172a and a motor shaft 172b. The gear assembly 174 includes a first gear 714a, a second gear 174b, a wire driving wheel 174c, a first shall 174d and a second shall 174e.

The power transmission member 177 includes a wire cover 177a, and a wire 177b retractably inserted in the wire cover 177a. The power transmission member 177 forms a pair to transmit the driving force to the pair of guide rails 150, respectively. The wire 177b is provided as a closed loop. The wire 177b has one side arc coupled to the wire driving wheel 174c, and the other side arc coupled to the support wheel unit 176 rotationally arranged in an upper end portion of the guide rail body 152.

As shown in FIG. 8, the support wheel unit 176 may be rotationally formed in the end portion of the guide rail body 152. The support wheel unit 176 rotationally supports a part of the wire 177b having a closed-loop shape. That is, the wire 177b has one end portion connected to the gear assembly, and the other end portion rotationally supported by the support wheel unit 176.

As shown in FIGS. 5 to 7, each of the pair of guide wheel units 179 includes a first guide wheel 179a, a second guide wheel 179b, a wheel casing 179c, and a wheel base 179d. The guide wheel unit 179 is positioned between the gear assembly 174 and the support wheel unit 176 so as to guide the wire 177b.

Thus, the driving force of the driving unit 170 is transmitted to the guide wheel unit 179, and then transmitted to the connecting part 144b, and its transmission direction is changed in the support wheel unit 176. The driving force of which the transmission direction is changed in the support wheel unit 176 is also transmitted to the guide wheel unit 179 and then transmitted to the driving unit 170.

As shown in FIGS. 3 and 10, the connection unit 190 is arranged in the main frame 110, and connects the main frame 110, the guide rail 150 and the shaft unit 130 with one another.

The connection unit 190 includes a connecting body 191, a guide rail connecting part 192, and a rotary shaft connecting part 193.

The connecting body 191 may be fastened to the main frame 110. The connecting body 191 may be formed with a wire through hole 191a in which the wire 177b can be retractably inserted (refer to FIGS. 3 and 6).

The guide rail connecting part 192 connecting with the guide rail 150 may be integrated into one side of the connecting body 191. Thus, it is possible to decreases the number of parts and reduce production cost. The guide rail connecting part 192 may be formed with a first connection unit hinge 192a and a second connection unit hinge 192b at end portions thereof. The first connection unit hinge 192a and the second connection unit hinge 192b are hingedly coupled to the guide rail hinge 158 (158a and 158b), respectively. Between the first connection unit hinge 192a and the second connection unit hinge 192b, a hinge guide slit 192c may be formed for passing the connecting part 144b of the shade curtain supporter 144 therethrough. Meanwhile, the guide rail connecting part 192, 292 is formed with a connection unit guide groove 192d for passing the connecting part 144b the shade curtain supporter 144 therethrough. The guide groove 154, the hinge guide slit 192c and the connection unit guide groove 192d are connected with one another so as to make the connecting part 144b of the shade curtain supporter 144 be retractable. Also, there is no difference in level among the guide groove 154, the hinge guide slit 192c and the connection unit guide groove 192d so as to make the connecting part 144b be softly retractable while the guide rail 150 is unfolded. Thus, there is an effect on reducing noise while a product operates.

The rotary shaft connecting part 193 connecting with the shaft unit 130 may be integrated into one side of the connecting body 191. Thus, it is possible to decreases the number of parts and reduce production cost. As shown in (a) of FIG. 10, the rotary shaft connecting part 193 may be formed with the first rotary shaft supporter 193a. The first rotary shaft supporter 193a may have a circular cross-section so that the first rotary shaft coupler 136a of the shaft unit 130 can be rotationally coupled thereto. The second rotary shaft supporter 193b may have a rectangular cross-section so that the second rotary shaft coupler 136b of the shaft unit 130 can be irrotationally coupled thereto.

Figure 13:
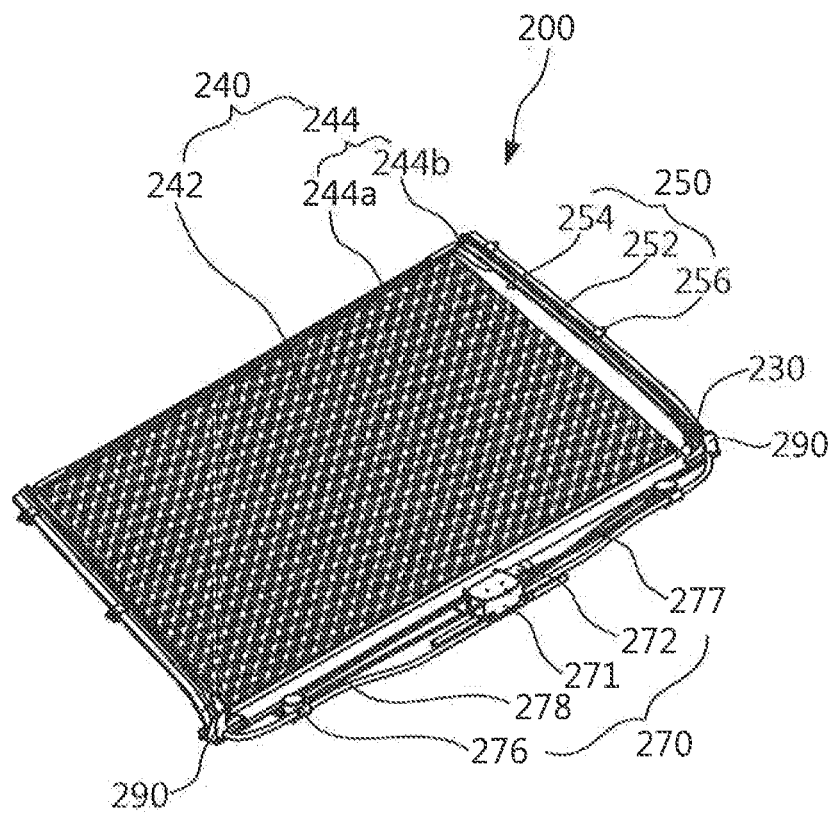
FIG. 13 is a perspective view showing an unrolled state of a shade curtain, in association with a window blind assembly for a vehicle according to the second exemplary embodiment of the present invention.
Figure 14:
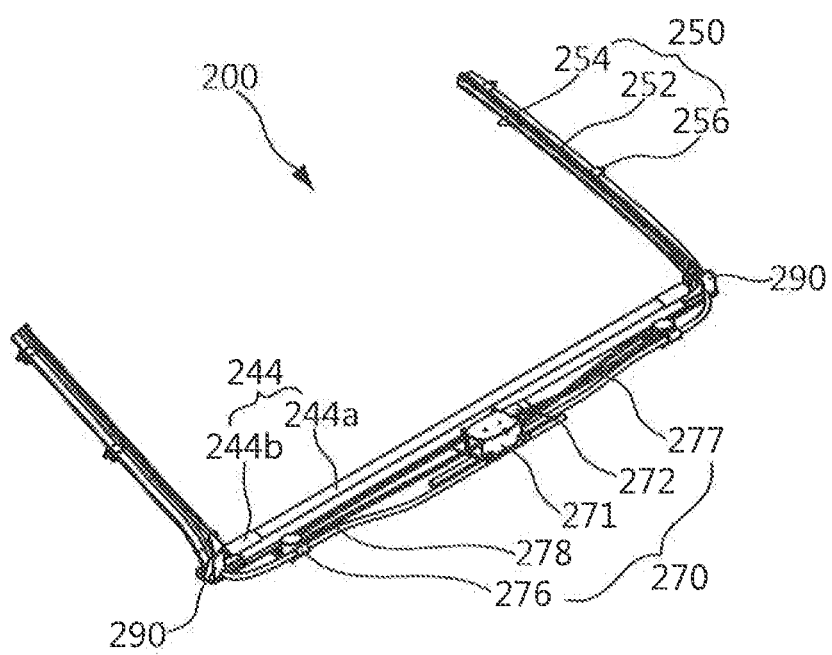
FIG. 14 is a perspective view showing a state that the shade curtain is rolled into a rotary shaft, in association with the window blind assembly for a vehicle according to the second exemplary embodiment of the present invention.
Figure 15:
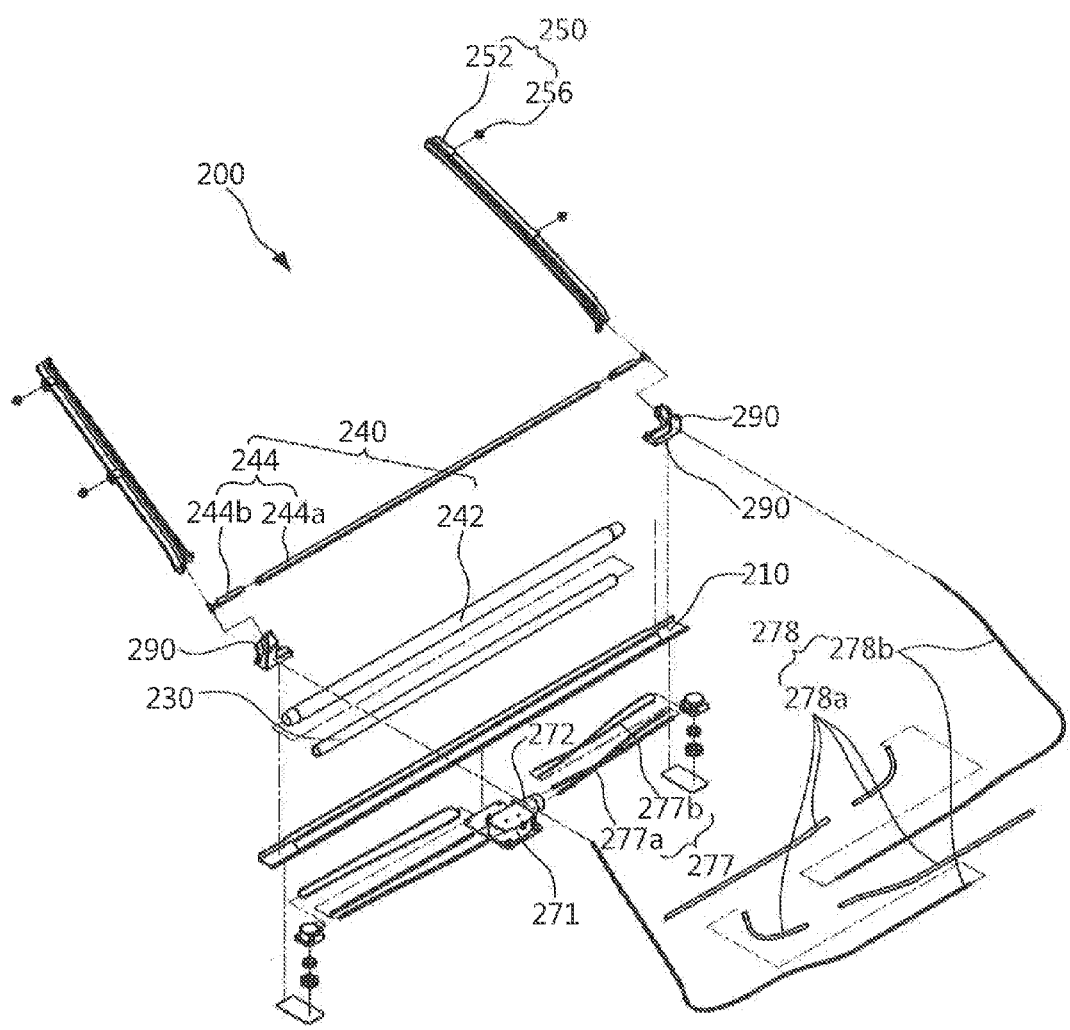
FIG. 15 is an exploded perspective view of the window blind assembly for a vehicle according to the second exemplary embodiment of the present invention.
Figure 16:
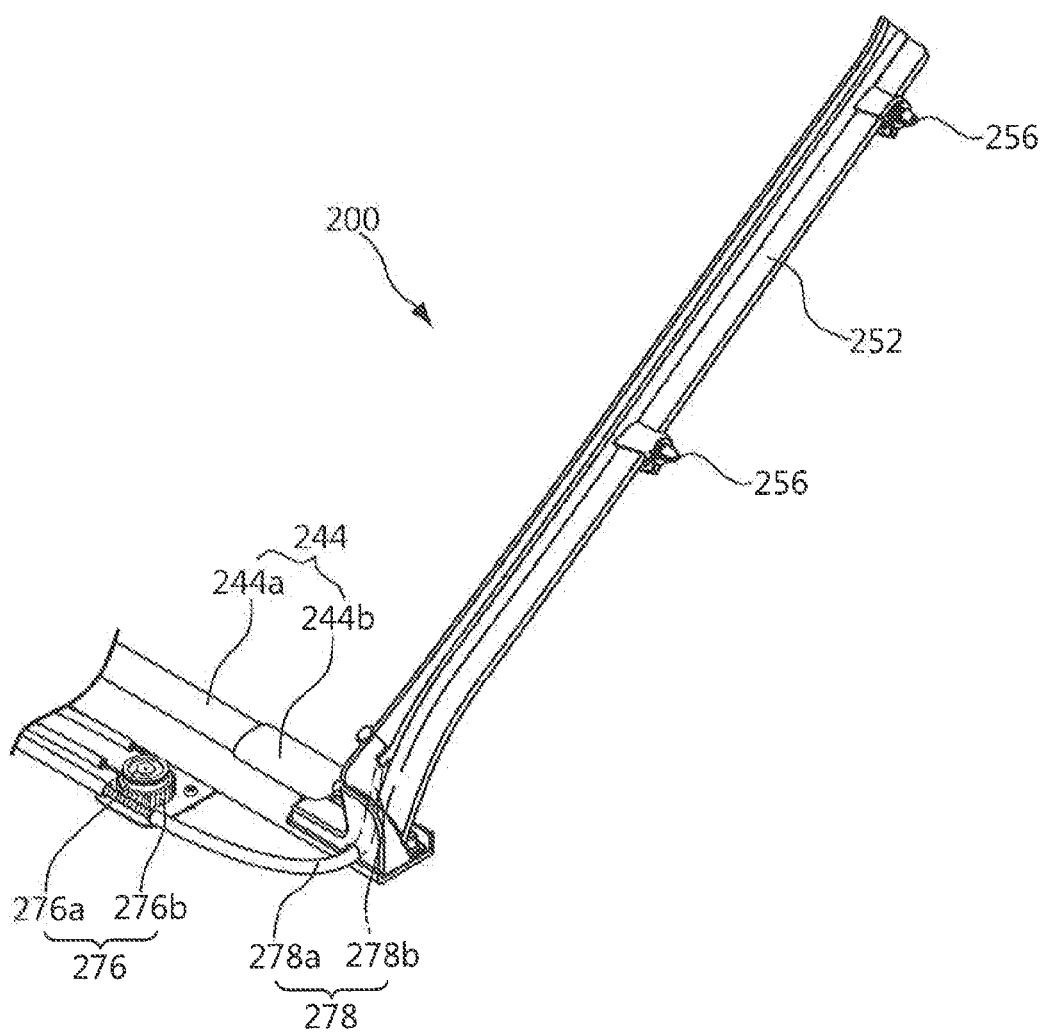
FIG. 16 is a partial perspective view of a guide rail and a support wheel unit in association with the window blind assembly for a vehicle according to the second exemplary embodiment of the present invention.
Figure 17:
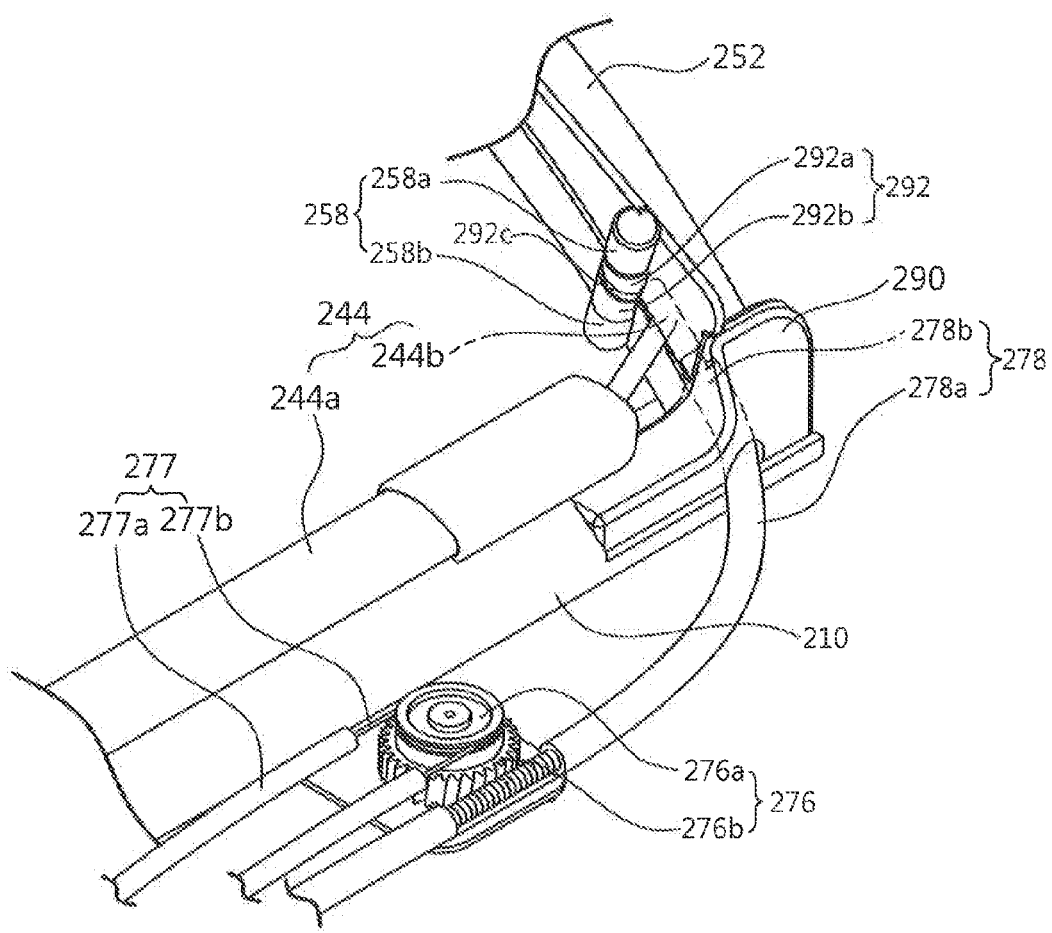
FIG. 17 is an enlarged perspective view of the guide rail and a support wheel unit in association with the window blind assembly for a vehicle according to the second exemplary embodiment of the present invention.
Figure 18:
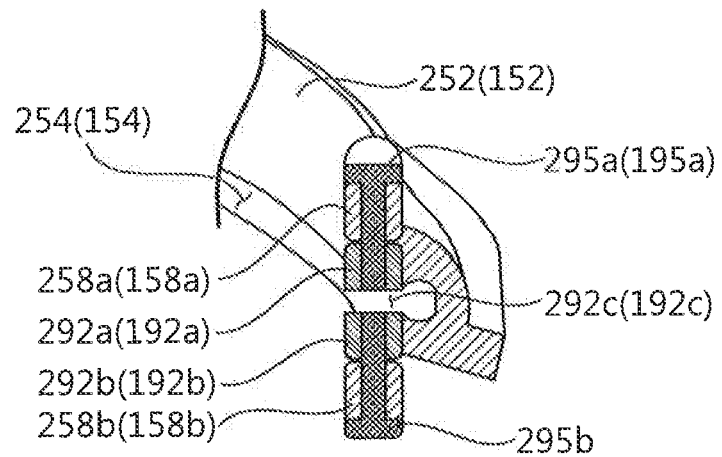
FIG. 18 is a cross-section view of a guide rail in association with the window blind assembly for a vehicle according to the second exemplary embodiment of the present invention.
Figure 18:
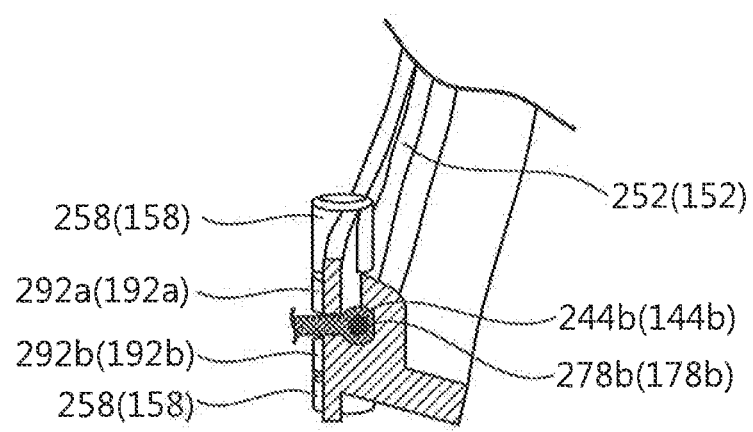
Figure 19:
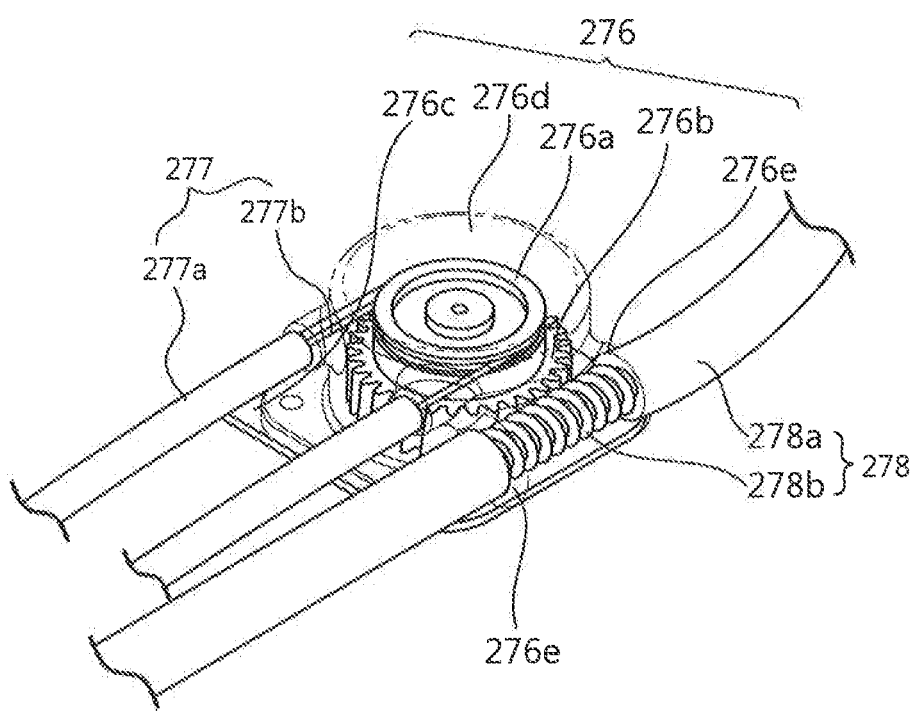
FIG. 19 is an enlarged perspective view of the support wheel unit in association with the window blind assembly for a vehicle according to the second exemplary embodiment of the present invention.

FIG. 13 is a perspective view showing an unrolled state of a shade curtain, in association with a window blind assembly for a vehicle according to the second exemplary embodiment of the present invention. FIG. 14 is a perspective view showing a state that the shade curtain is rolled into a rotary shaft, in association with the window blind assembly for a vehicle according to the second exemplary embodiment of the present invention. FIG. 15 is an exploded perspective view of the window blind assembly for a vehicle according to the second exemplary embodiment of the present invention. FIG. 16 is a partial perspective view of a guide rail and a support wheel unit in association with the window blind assembly for a vehicle according to the second exemplary embodiment of the present invention. FIG. 17 is an enlarged perspective view of the guide rail and a support wheel unit in association with the window blind assembly for a vehicle according to the second exemplary embodiment of the present invention. FIG. 18 is a cross-section view of a guide rail in association with the window blind assembly for a vehicle according to the second exemplary embodiment of the present invention. FIG. 19 is an enlarged perspective view of the support wheel unit in association with the window blind assembly for a vehicle according to the second exemplary embodiment of the present invention.

As shown in FIGS. 13 to 15, a widow blind assembly 200 for a vehicle according to the second exemplary embodiment of the present invention includes a main frame 210, a shaft unit 230, a blind unit 240, a guide rail 250 and a driving unit. With regard to elements similar to those described in the first exemplary embodiment will be omitted for convenience.

The blind unit 240 includes a shade curtain 242 and a shade curtain supporter 244. The shade curtain supporter 244 includes a support body 244a and a connecting part 244b.

At least a part of the connecting part 244b may be accommodated in a guide groove 254 of the guide rail body 252. The connecting part 244b is connected to a second wire 278b of a second power transmission member 278 so that the support body 244a can move up and down along the guide groove 254.

The guide rail 250 includes a guide rail body 252, a guide groove 254 and a guide rail supporter 256. The guide rail body 252 may rotate with respect to the guide rail hinge 258 and first and second hinge shafts 295a and 295b. If the window blind assembly for a vehicle is transported while the guide rail is folded, the volume of the assembly is decreased to thereby have an effect on convenience of transport and reduced cost of transport.

As shown in FIGS. 13 to 15, the driving unit 270 includes a casing 271, a motor 272, a gear assembly 274, a support wheel unit 276, a first power transmission member 277, and a second power transmission member 278.

As shown in FIGS. 11 and 12, the gear assembly 274 includes a first gear 274a, a second gear 274b, a wire driving wheel 274c, a first shaft 274d and a second shaft 274e. The wire driving wheel 274c is coupled with a pair of first wires 277b so that the rotary force of the wire driving wheel 274c can be transmitted to the first power transmission member 277.

As shown in FIG. 15, the first power transmission member 277 includes a first wire cover 277a, and a first wire 277b retractably inserted in the first wire cover 277a. The first wire 277b has one side arc coupled to the wire driving wheel 274c, and the other side arc coupled to a support wheel 276a of the support wheel unit 276.

As shown in FIG. 19, the second power transmission member 278 includes a second wire cover 278a, and a second wire 278b retractably inserted in the second wire cover 278a. The second wire 278b is formed with a concavo-convex pattern on the surface thereof to mate with the support gear 276b so that the second wire 278b can move forward or backward as the support gear 276b rotates. The second wire 278b has stiffness strong enough to free from buckling even when pushing the connecting part 244b upward along the guide groove 254.

As shown in FIG. 19, the support wheel unit 276 includes a support wheel 276a, a support gear 276b, a support plate 276c, a first casing 276d, and a second casing 276e. For the convenience of description, the first casing 276d and the second casing 276e were omitted in FIGS. 16 and 17. For the convenience of description, the first casing 276d and the second casing 276e were illustrated as dotted lines in FIG. 19.

Thus, the rotary motion of the driving unit 270 is transferred to the support wheel unit 276, and the support wheel unit 276 transforms the rotary motion into the rectilinear motion, thereby moving the second wire 278b forward or backward.

In FIG. 18, (a) is a cross-section view taken along line A-A of FIG. 17, and (b) is a cross-section view taken along line B-B of FIG. 17. The configuration shown in FIG. 18 is the same as described in the first exemplary embodiment, and the following description will be based on the second exemplary embodiment to avoid repetitive descriptions.

Referring to (a) of FIG. 18, the first connection unit hinge 292a, 192a and the first guide rail hinge 258a, 158a are rotationally coupled by the first hinge shaft 295a, 195a. The second connection unit hinge 292b, 192b and the second guide rail hinge 258b, 158b are rotationally coupled by the second hinge shaft 295b, 195b. the first hinge shaft 295a, 195a and the second hinge shaft 295b, 195b are spaced apart from each other by the hinge guide slit 292c so that the connecting part 244b of the shade curtain supporter 244 can pass through the hinge guide slit 292c.

Referring to (b) of FIG. 18, it is illustrated that the connecting part 244b of the shade curtain supporter 244 is partially accommodated in the hinge guide slit 292c. The connecting part 244b and the second wire 278b are coupled integrally with each other so that the second wire 278b can be moved by the connecting part 244b.

As described above, if the window blind assembly for a vehicle is transported while the guide rail is folded, the volume of the assembly is decreased to thereby have an effect on convenience of transport and reduced cost of transport. The guide rail connecting part connected to the guide rail may be integrated into one side of the connecting body. Also, the rotary shaft connecting part may be integrated into one side of the connecting body. Thus, it is possible to decreases the number of parts and reduce production cost.

Further, there is no difference in level between the guide groove and the connecting part guide groove, so that noise can be reduced when the product operates.

vibration and noise are reduced and reliability of operation is enhanced.

Technical effects of the present invention are not limited to the foregoing technical effect, and other technical effects not mentioned above will be clearly understood by those skilled in the art from the following descriptions.

The exemplary embodiments should be considered in descriptive sense only and not for purposes of limitation. Therefore, the scope of the invention is defined not by the detailed description of the invention but by the appended claims, and it will be understood by a person having ordinary skill in the art that various changes in form and details may be made therein without departing from the spirit and scope of the invention as defined by the appended claims.

What is claimed is:

1. A window blind assembly for a vehicle, comprising:
a main frame;
a pair of connection units arranged in the main frame, each connection unit including a guide rail connecting part integrally formed therewith and protruding therefrom, each of the guide rail connecting parts including a connection unit hinge at an end portion thereof;
a rotary shaft rotationally arranged in each of the connection units;
a pair of guide rails each including guide grooves, at least one of the guide rails rotationally arranged in at least one of the connection units of the pair of connection units and each of the guide rails including a guide rail hinge formed at an end portion thereof and hingedly coupled to a respective one of the connection unit hinges;
a shade curtain supporter movably coupled to the guide grooves of the pair of guide rails;
a shade curtain including one side end portion connected to the rotary shaft and rolled into the rotary shaft, and the other side end portion connected to the shade curtain supporter and unrolled as the shade curtain supporter becomes apart from the rotary shaft;
a driving unit providing driving force to move the shade curtain supporter along the pair of guide rails;
each of the guide rail connecting parts including a connection unit guide groove so that opposite end portions of the shade curtain supporter are retractable as being at least partially accommodated in the connection unit guide groove; and
each of the connection unit hinges including a first connection unit hinge and a second connection unit hinge spaced apart from each other to form a hinge guide slit therebetween, and the opposite end portions of the shade curtain supporter pass through the hinge guide slit when moving between the guide groove and the connection unit guide groove.

2. The window blind assembly for a vehicle according to claim 1, wherein the guide groove and the connection unit guide groove have the same cross-section shape as each other so that the opposite end portions of the shade curtain supporter can move softly between the guide groove and the connection unit guide groove.

3. The window blind assembly for a vehicle according to claim 1, wherein the connection unit hinge and the guide rail hinge are positioned out of a moving path of the shade curtain supporter when the opposite end portions of the shade curtain supporter move between the guide groove and the connection unit guide groove as being at least partially accommodated in the guide grooves.

4. The window blind assembly for a vehicle according to claim 3, wherein the guide rail hinge comprises a first guide rail hinge and a second guide rail hinge spaced apart from each other to form a guide slit therebetween, and the opposite end portions of the shade curtain supporter pass through the guide slit when moving between the guide groove and the connection unit guide groove.

5. The window blind assembly for a vehicle according to claim 1, wherein the guide rail hinge comprises a first guide rail hinge and a second guide rail hinge spaced apart from each other, the first connection unit hinge and the first guide rail hinge are rotationally coupled with respect to a first hinge shaft, and the second connection unit hinge and the second guide rail hinge are rotationally coupled with respect to a second hinge shaft.

6. The window blind assembly for a vehicle according to claim 1, wherein the connection unit comprises a rotary shaft connecting part which protrudes from one side of the connection unit and in which the rotary shaft is rotationally arranged.

7. The window blind assembly for a vehicle according to claim 6, wherein one side of the rotary shaft rotationally couples with the rotary shaft connecting part of one of the pair of connection units, a second side of the rotary shaft rotationally couples with a rotary shaft coupler, and the rotary shaft coupler irrotationally couples with the rotary shaft connecting part of the other one of the pair of connection units.

8. The window blind assembly for a vehicle according to claim 7, wherein the rotary shaft is internally provided with a spring, and the spring comprises one side coupled to the rotary shaft and the other side coupled to the connection unit.

9. The window blind assembly for a vehicle according to claim 6, wherein the rotary shaft comprises one side to which a first rotary shaft coupler is coupled and the other side to which a second rotary shaft coupler is rotatably coupled, the first rotary shaft coupler is rotationally coupled to the rotary shaft connecting part of one of the pair of connection units, and the second rotary shaft coupler is irrrotatably coupled to the rotary shaft connecting part of the other one of the pair of connection units.

10. The window blind assembly for a vehicle according to claim 1, wherein the driving unit comprises:
   a motor;
   a gear assembly connected to the motor; and
   a first wire having a closed-loop shape and connected to the gear assembly so that driving force of the motor can be transferred to the shade curtain supporter.

11. The window blind assembly for a vehicle according to claim 10, wherein the driving unit further comprises an additional first wire forming a pair of first wires to respectively transfer driving force to opposite end portions of the shade curtain supporter.

12. The window blind assembly for a vehicle according to claim 11, wherein the gear assembly comprises a wire driving wheel to transfer rotary force from the motor to the pair of first wires, and the pair of first wires is connected to the wire driving wheel so that the pair of first wires can rotate in opposite directions to each other.

13. The window blind assembly for a vehicle according to claim 10, wherein
   the driving unit further comprises a support wheel unit, and
   the first wire comprises one side end portion connected to the gear assembly, and the other side end portion rotationally supported by the support wheel unit.

14. The window blind assembly for a vehicle according to claim 13, wherein
   the shade curtain supporter comprises a support body connected to the one side end portion of the shade curtain, and a connecting part formed at opposite end portions of the support body, and
   the connecting part is fastened to the first wire so that the support body can move as the first wire rotates.

15. The window blind assembly for a vehicle according to claim 14, wherein the support wheel unit is arranged in the guide rail so as to rotationally support one end portion of the first wire.

16. The window blind assembly for a vehicle according to claim 15, wherein the driving unit further comprises a guide wheel unit positioned between the gear assembly and the support wheel unit so as to guide the first wire.

17. The window blind assembly for a vehicle according to claim 13, wherein
   the support wheel unit is arranged in the main frame, and
   the driving unit further comprises a second wire which has one side connected to the support wheel unit so as to transform rotary motion of the support wheel unit into rectilinear motion, and the other side connected to the shade curtain supporter so as to move the shade curtain supporter.

* * * * *